US006527285B1

(12) United States Patent
Calandro, II

(10) Patent No.: US 6,527,285 B1
(45) Date of Patent: Mar. 4, 2003

(54) AMBULATORY STROLLER

(76) Inventor: Vito John Calandro, II, 107 Gully Branch La., Myrtle Beach, SC (US) 29572

( * ) Notice: Subject to any disclaimer, the term of this patent is extended or adjusted under 35 U.S.C. 154(b) by 0 days.

(21) Appl. No.: 09/960,112

(22) Filed: Sep. 21, 2001

(51) Int. Cl.[7] .............................. B62B 7/00; B62B 1/00; A63C 3/04; A63B 22/20

(52) U.S. Cl. ...................... 280/87.051; 280/650; 297/5; 482/68

(58) Field of Search ....................... 280/87.051, 87.041, 280/87.021, 87.01, 650; 297/5, 344.18, 136; 482/68

(56) References Cited

U.S. PATENT DOCUMENTS

| | | | | |
|---|---|---|---|---|
| 282,980 A | * | 8/1883 | Habegger | 482/68 |
| 320,462 A | * | 6/1885 | Cowing | 482/68 |
| 3,778,052 A | * | 12/1973 | Andow et al. | 272/70.4 |
| 4,312,505 A | | 1/1982 | Engelhart | |
| 4,342,465 A | | 8/1982 | Stillings | |
| 4,743,008 A | | 5/1988 | Fermaglich et al. | |
| 4,770,410 A | | 9/1988 | Brown | |
| 4,773,639 A | | 9/1988 | Graves | |
| 4,890,853 A | | 1/1990 | Olson | |
| 5,083,806 A | | 1/1992 | Brown | |
| 5,085,428 A | | 2/1992 | Fermaglich et al. | |
| 5,174,590 A | * | 12/1992 | Kerley et al. | 280/1.5 |
| 5,211,607 A | | 5/1993 | Fermaglich et al. | |
| 5,228,708 A | * | 7/1993 | Verdugo | 280/200 |
| 5,302,163 A | | 4/1994 | Fermaglich et al. | |
| 5,380,262 A | * | 1/1995 | Austin | 482/68 |
| 5,409,437 A | | 4/1995 | Lauro et al. | |
| 5,688,211 A | | 11/1997 | Myers | |
| 5,728,030 A | | 3/1998 | Hsieh | |
| 5,732,961 A | | 3/1998 | Theodoropoulos | |
| 5,813,948 A | | 9/1998 | Quigg et al. | |
| 5,888,178 A | | 3/1999 | Welsh, Jr. | |
| 6,068,273 A | * | 5/2000 | Rao et al. | 280/87.021 |
| 6,170,840 B1 | * | 1/2001 | Mathias | 280/87.041 |

* cited by examiner

*Primary Examiner*—Brian L. Johnson
*Assistant Examiner*—Gerald Klebe
(74) *Attorney, Agent, or Firm*—Harleston Law Firm LLC; Kathleen M. Harleston

(57) ABSTRACT

A stroller for helping an individual to ambulate includes: (a) an upper ring assembly, including an upper ring member and a hinged upper gate segment having an open position and a closed position; (b) a lower ring assembly, including a lower ring member, the upper ring member being substantially parallel to and above the lower ring member, the upper ring member having a diameter between about ¼ and ½ the diameter of the lower ring member; (c) a seat assembly connected to the upper ring member; (d) at least three spaced-apart legs connecting the lower ring member to the upper ring member; and (e) at least three spaced-apart wheels connected to the base of the lower ring member.

17 Claims, 10 Drawing Sheets

AMBULATORY STROLLER

BACKGROUND OF THE INVENTION

1. Technical Field

The present device is an ambulatory stroller for persons who experience difficulty balancing while upright.

2. Background Information

Many older patients, particularly those with Alzheimer's disease, become disoriented while walking, which causes them to fall and hurt themselves. Such patients may, for example, have dementia, Parkinson's disease, inner ear problems, severe osteoporosis, or multiple sclerosis, or be postoperative. Although these problems/diseases are more common among geriatric patients, these patients may be middle aged or even young. Keeping them bedridden or bound in a chair is not a viable alternative, since that can create worse problems, such as bedsores, muscular atrophy, and depression.

With the aging baby boomers generation, the numbers of such patients are on the increase. Not all of these patients are in hospitals or nursing homes; many aging parents are being cared for in individual homes, too. The problem has become serious, with increasing attendant expense to the general population for CT scans and medical procedures for diagnosing and treating injuries from such falls. These injuries are physically painful for the patients, and emotionally painful for their caregivers.

Traditional canes and walkers are not adequate for such patients. Confused patients often find it prohibitively difficult to use a cane. They can easily fall backward or tip over when using a walker, and they often simply wander away from it. There is a serious and immediate need among such patients for a device to permit them to ambulate, yet prevent them from falling while doing so. A stroller which also prevents them from wandering off is even more advantageous.

BRIEF SUMMARY OF THE INVENTION

The present invention is a stroller for helping an individual to ambulate, the stroller comprising: (a) an upper ring assembly, comprising an upper ring member and a hinged upper gate segment having an open position and a closed position; (b) a lower ring assembly, comprising a lower ring member, the upper ring member being substantially parallel to and above the lower ring member; (c) a seat assembly connected to the upper ring member; (d) at least three spaced-apart legs connecting the lower ring member to the upper ring member; and (e) at least three spaced-apart wheels connected to the base of the lower ring member.

The stroller, then, includes two rigid tubular ring members that are parallel to one another and horizontal to the walking surface. The upper ring member has a diameter that is between about ¼ and ½, most preferably ½, of the diameter of the lower ring member. The upper ring member is sized to substantially fit a large adult's torso. There are preferably five inclined, telescoping legs.

The lower ring member is only a few inches, depending on the wheel diameter, from the walking surface. The lower ring member most preferably has a diameter just under the standard width of hospital or nursing home doorways, so that the user can pass through the doorways once they are hooked into the stroller. However, the lower ring member's diameter must be about twice that of the upper ring member, so that the device will remain stable. The lower ring member preferably also includes a hinged lower gate segment, which opens and closes at the same time as the hinged upper gate segment. In those embodiments without a lower hinged gate segment, the user simply steps over the lower ring member to enter the device.

This invention permits such patients to ambulate, yet largely prevents them from falling while doing so. Since they can be secured into the stroller, they are also prevented from wandering off. Strollers of the present invention are relatively inexpensive, especially when cost savings for fewer CT scans and medical procedures for diagnosing and treating injuries from these falls are taken into account. With the present device in general use, the number of painful injuries and deaths from such falls can be reduced. Also, the patients feel more independent, and the caregivers have more free time for themselves and to perform other tasks.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
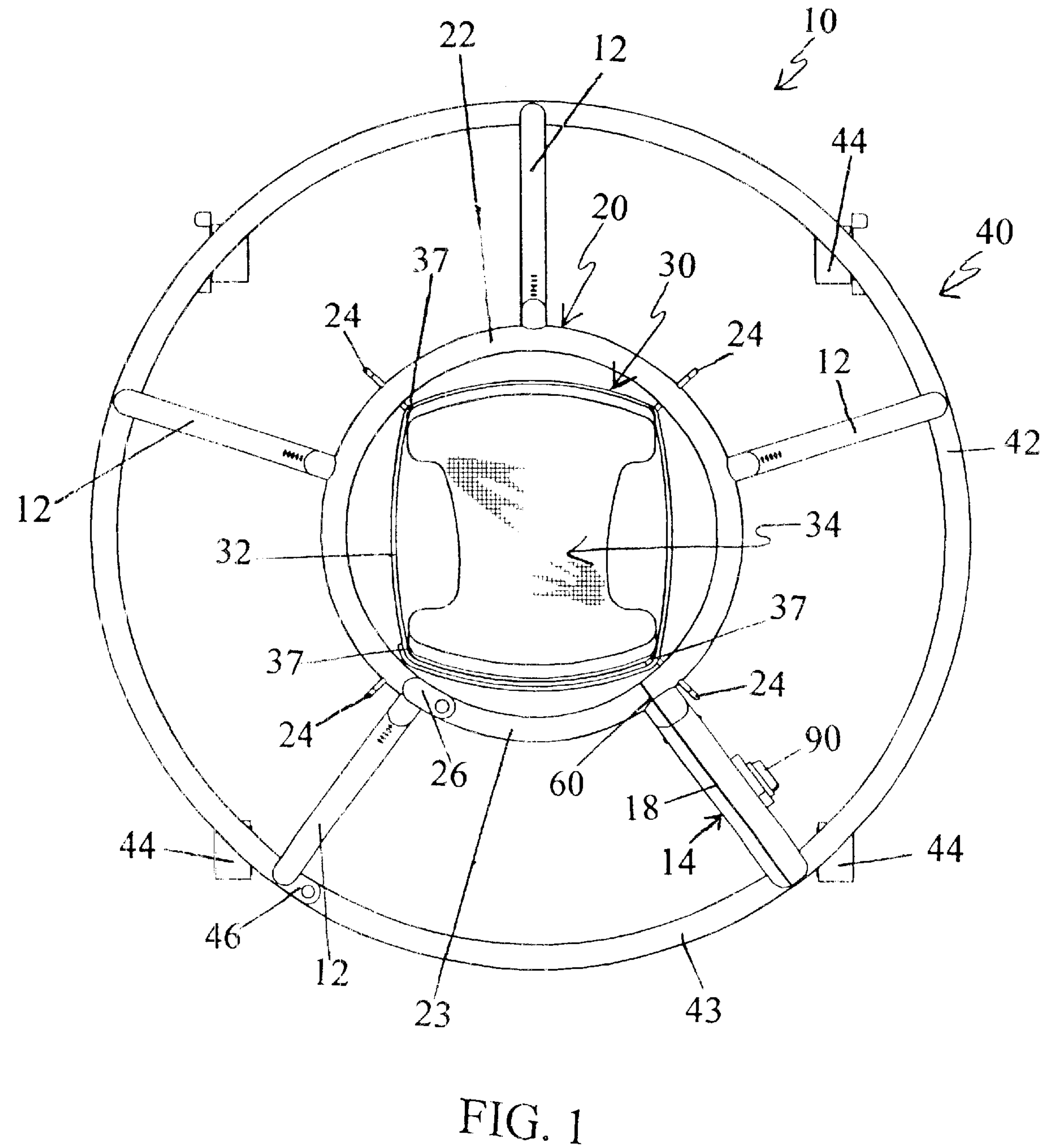
FIG. 1 shows a top plan view of an ambulatory stroller according to the present invention.

In the following description, like reference characters designate like or corresponding parts throughout the several views. Also, in the following description, it is to be understood that such terms as "front," "back," "within," and the like are words of convenience and are not to be construed as limiting terms. Referring in more detail to the drawings, the invention will now be described.

Figure 2:
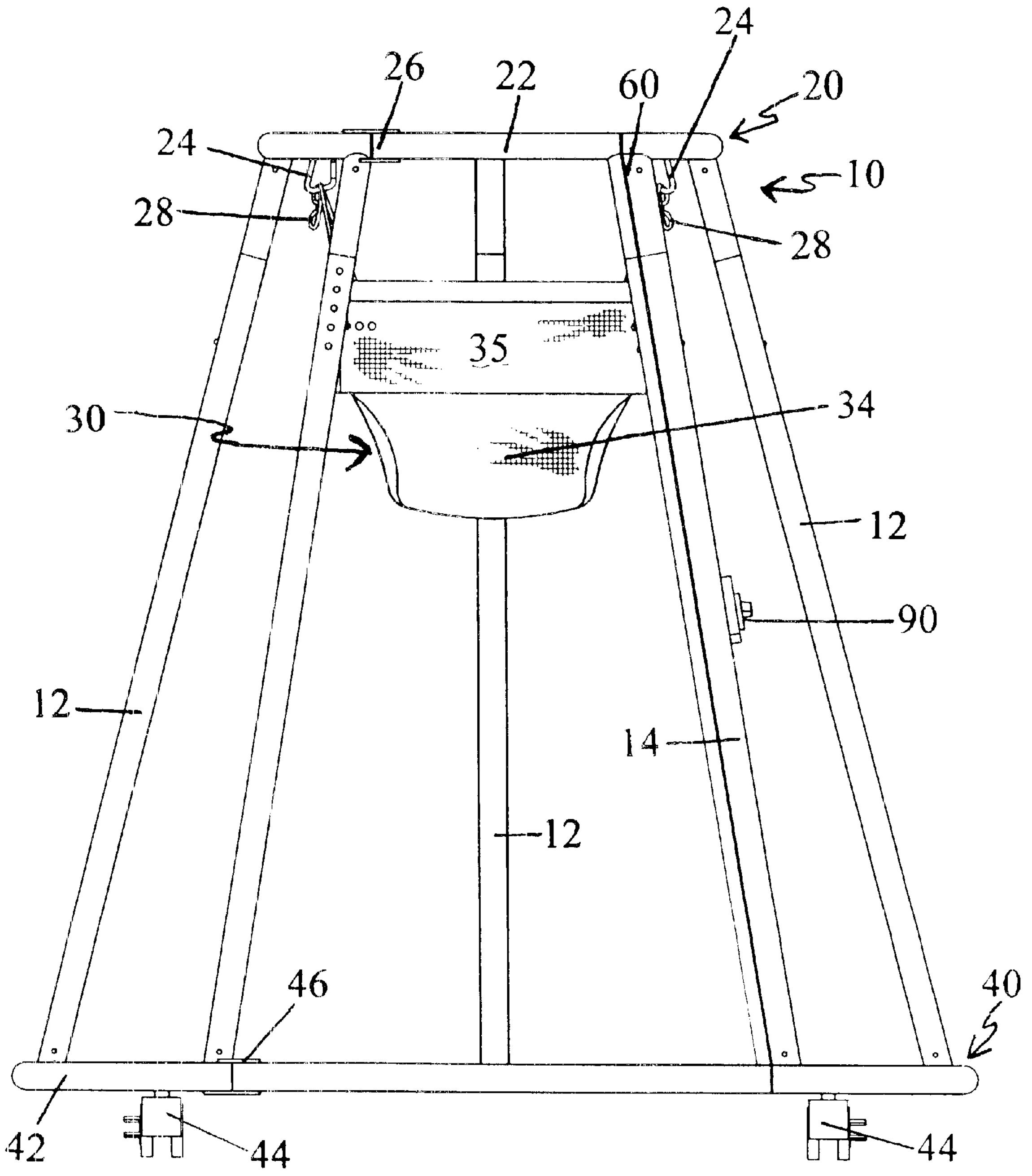
FIG. 2 is a front elevational view of the ambulatory stroller according to FIG. 1.

Turning first to FIGS. 1 and 2, a stroller 10 according to the present invention for helping an individual to ambulate includes:

(a) an upper ring assembly 20 comprising an upper ring member 22 and a hinged upper gate segment 23 having an open position and a closed position;

(b) a lower ring assembly 40 comprising a lower ring member 42;

(c) a seat assembly 30 connected to the upper ring member 22;

(d) at least three spaced-apart, inclined legs 12 connecting the lower ring member 42 to the upper ring member 22; and (e) at least three spaced-apart wheels 44 connected to the bottom of the lower ring member 42.

As shown in FIG. 1 and FIG. 2, the two generally rigid, tubular ring members 22, 42 are parallel to one another and horizontal to the walking surface. The upper ring member 22 is sized to be somewhat larger than an average large adult's torso. The upper ring member is preferably padded so that it can be leaned upon or gripped by the user. The top of the front portion of the upper ring member 22 may form a small tray with a flat upper surface for holding belongings, snacks, or activities for the patient in the stroller 10. A horn or other sounding device may be mounted on the upper ring member for the patient in the stroller to blow.

The upper ring member 22 is substantially parallel to and above the lower ring member 42, and has a diameter between about ⅕ and ½ of the diameter of the lower ring member 42. The lower ring member 42 may be weighted for stability. The lower ring member 42 has a large diameter in order to prevent the stroller 10 from tipping during use. Because it is larger, the lower ring member impacts walls before the rest of the device, thus preventing the patient (user) from bumping into a wall and hurting himself or herself. The ring members are preferably made of lightweight, plastic-coated aluminum.

The upper 22 and lower 42 ring members are connected to one another by at least three legs 12, or braces, which are preferably telescoping or otherwise height adjustable. Telescoping legs allow the stroller to be adjusted for use by short, medium height, or tall patients. The legs 12 incline outwardly from the smaller upper ring member 22 to the larger lower ring member 42. The stroller 10 most preferably has five telescoping legs 12, as shown in FIGS. 1–5, for good stability.

A novel hanging seat assembly 30 is suspended from the upper ring assembly 20 by means of a series of about four evenly spaced linking clip members 24, most preferably a specialized carabiner for use herein. The seat assembly 30 has a flexible seat 34 suspended from the upper ring member 22. A simpler, diaper-like seat can be employed instead of the novel seat assembly herein, if desired.

As shown in FIG. 1, the upper ring member 22 includes a hinged upper gate segment 23. The upper gate segment preferably makes up between about ⅕ and ⅓ of the ring member and is large enough to admit an average adult male's torso. The upper gate segment 23 attaches to the remainder of the upper ring member 22 by means of a hinge 26 on one end of the segment and a specialized latch mechanism 60 on the other end of the segment. The lower ring member 42 preferably includes a similar gate segment 43, which likewise attaches to the remainder of the lower ring member 42 by means of a hinge 46 on one side and a latch mechanism 80 on the other side. For embodiments without a gate segment on the lower ring member, the patient simply steps over the lower ring, which is ordinarily only a few inches off the ground, to enter the stroller 10. The lower ring gate segment, though, spares the user from having to step over the lower ring member when entering the stroller. Doing so can confuse and upset some patients. Preferably, one mechanism herein allows the caregiver to open both gate segments at once. This can be important to the caregiver because it reduces the time it takes to fasten the patient in the device, and because confused patients can become recalcitrant in even slightly complicated situations.

Figure 3:
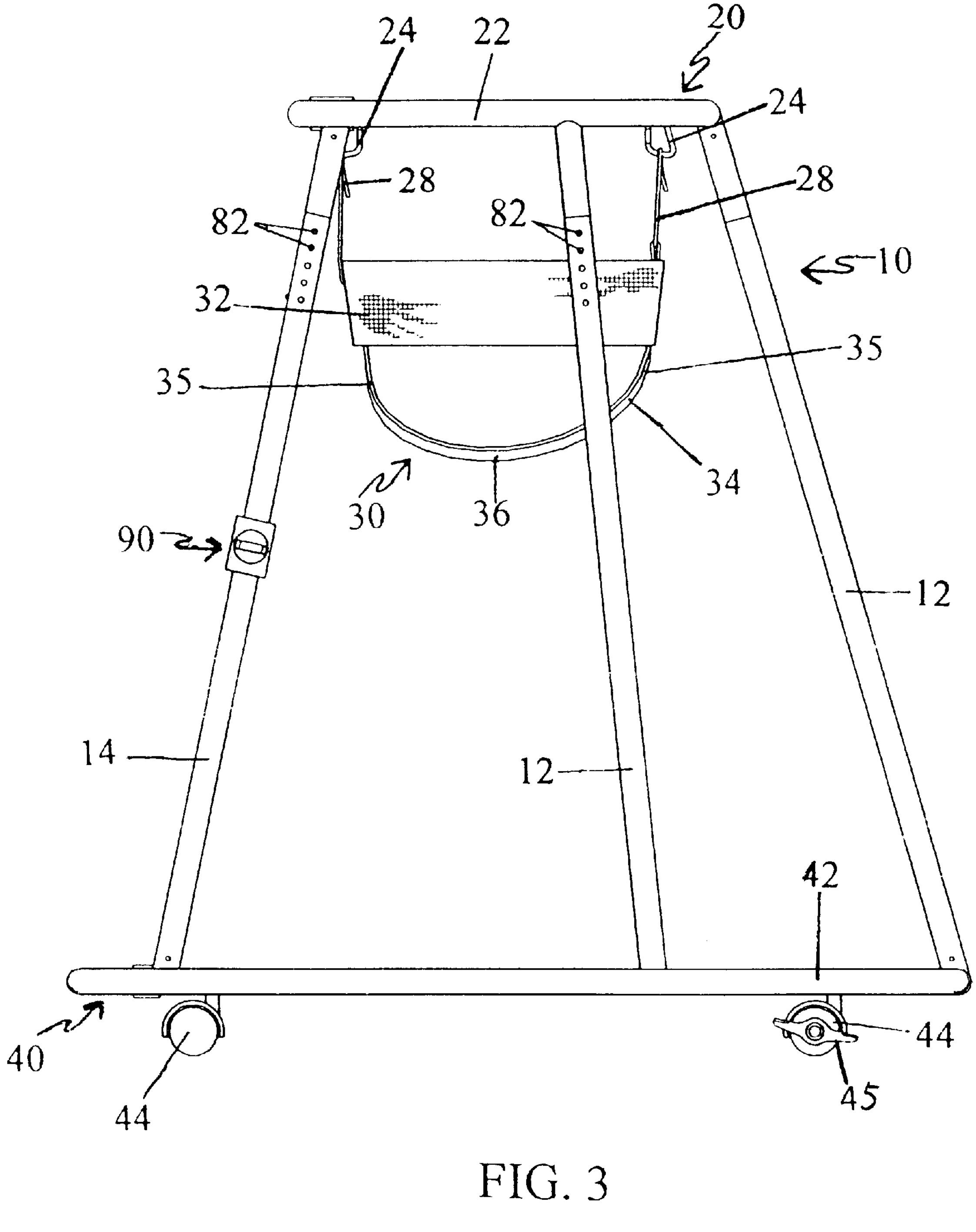
FIG. 3 is a left side elevational view of the ambulatory stroller according to FIG. 2.

As shown in FIG. 2 and FIG. 3, the lower ring assembly 40 is supported by at least three, and preferably four, evenly spaced wheels 44. The wheels, or casters, are most preferably only a couple of inches in diameter. The wheels 44 allow the patient to locomote in the stroller 10 in any direction. The stroller preferably also includes a brake mechanism 45 for braking the wheels 44, as shown in FIG. 3. The brake mechanism may include hand operated controls mounted on the upper ring member 22.

Referring to FIG. 1, FIG. 2, FIG. 3, FIG. 4, and FIG. 5, the seat assembly 30 comprises a flexible seat 34 made preferably of a lightweight, sturdy, durable, washable material, such as a nylon or polyester fabric, although it could possibly be made of leather or canvas. The preferred seat 34 generally has a diaper shape, as is apparent in FIG. 2. It is suspended from the upper ring member 22 at several releasable point. The seat assembly 30 preferably includes a U-bracket with accessory novel linking clip members 24 to the upper ring member 22. Conventional carabiners, brass barrel locks, or the like can be utilized instead of the linking clip members, if desired. These are each connected to adjustable chains 28, vinyl-coated wire springs, or other suitable material, which are each connected to one end of a surrounding strap member 32.

In short, once the patient is in the stroller, the detachable portion of the seat assembly 30 is passed between his or her legs and hooked to the upper ring member 22. The height of the legs 12 is adjusted for each patient so that the upper ring member 22 is waist to chest high, and the seat 34 is just below the level of the patient's buttocks, so that the patient falls into the seat if he trips. Also, if the patient tires, she can rest in the seat with her knees slightly bent and nevertheless remain ambulatory by shuffling her feet along the floor. Many older patients appear to prefer this partial sitting position because it requires less effort on their part.

Figure 4:
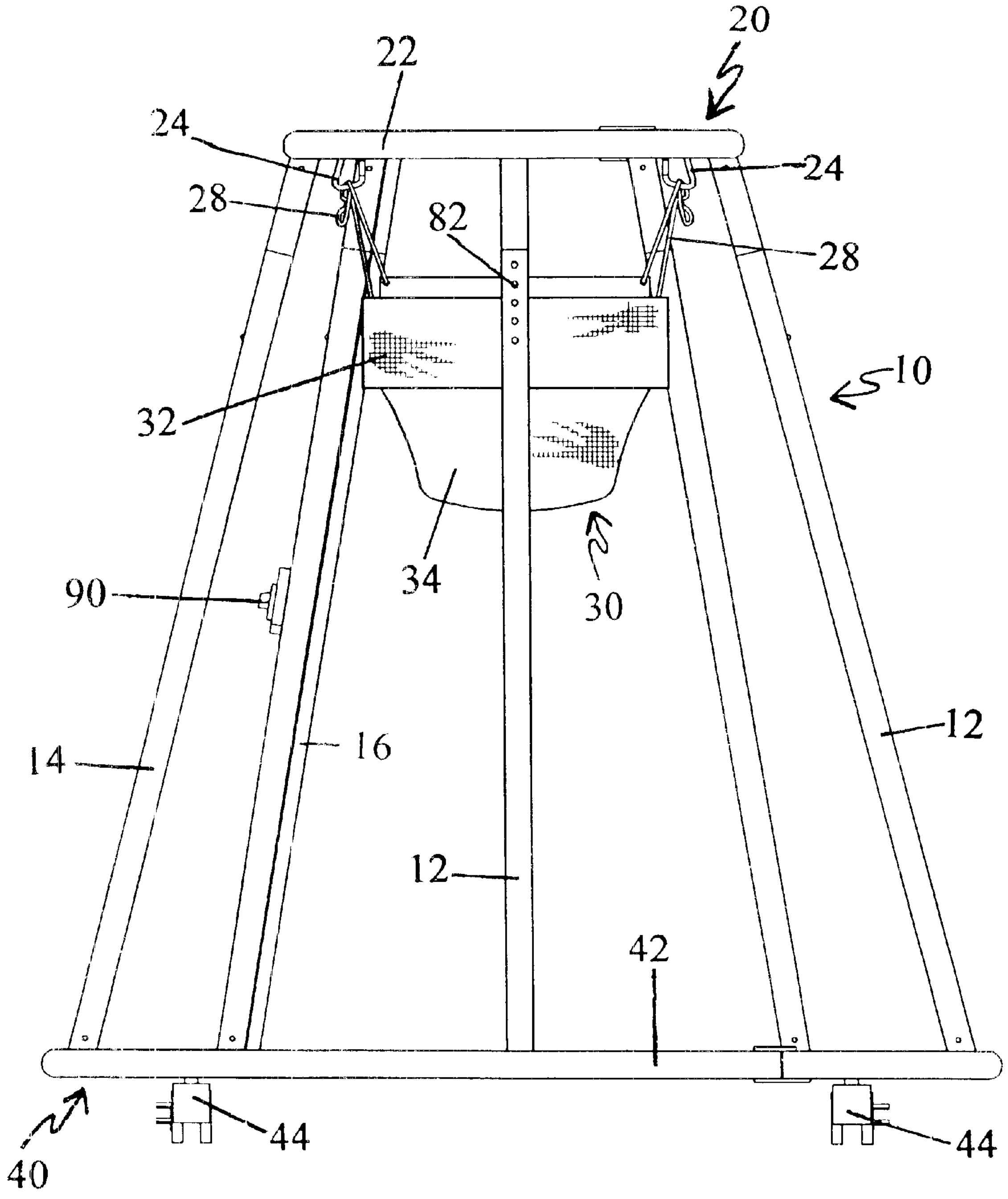
FIG. 4 is a rear elevational view of the ambulatory stroller according to FIG. 2.
Figure 5:
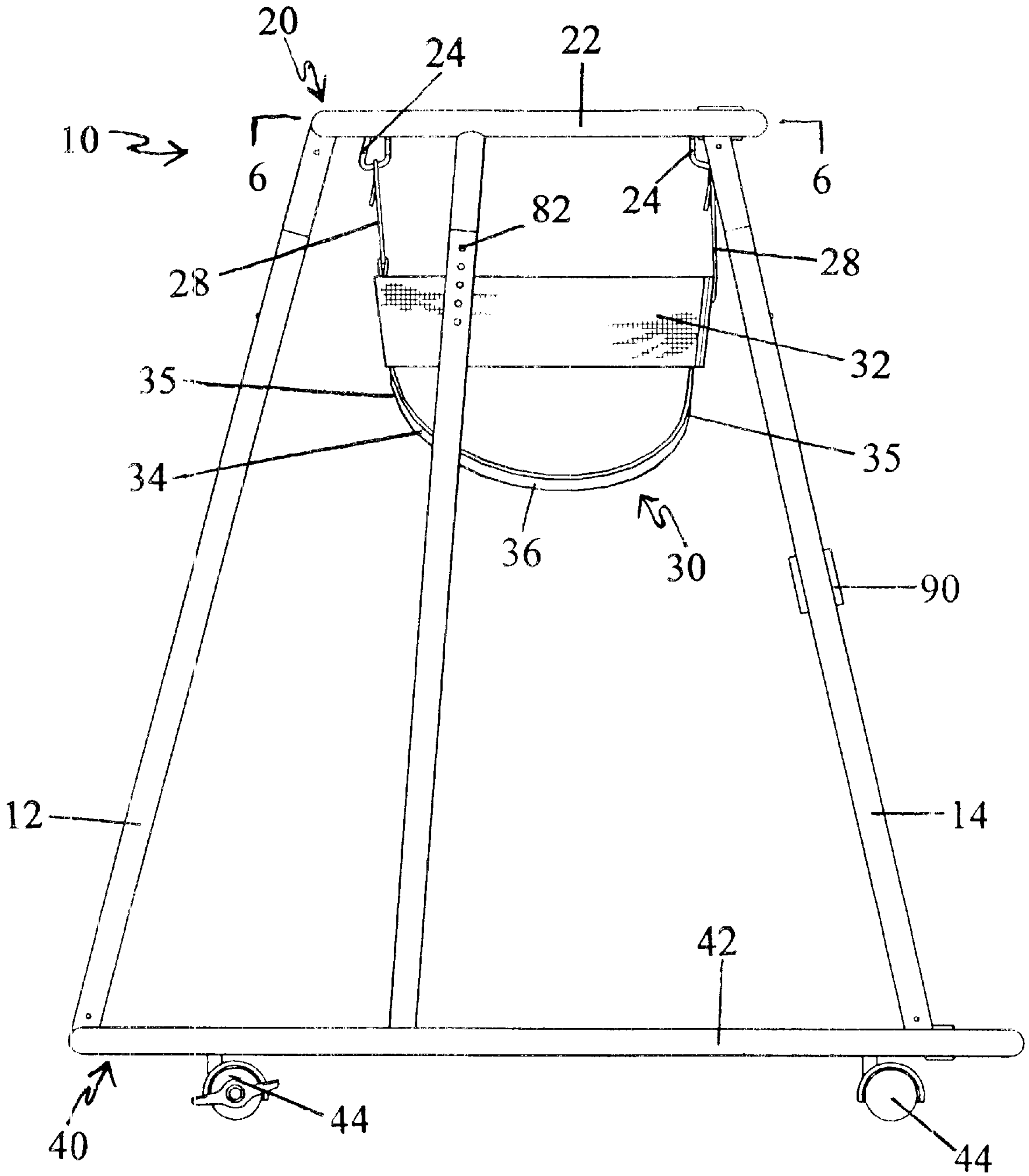
FIG. 5 is a right side elevational view of the ambulatory stroller according to FIG. 2.

When this preferred embodiment is in use, the seat 34 is curved, such that wider end portions 35 of the seat 34 are at a near-vertical position, while a narrower center portion 36 of the seat 34 remains horizontally oriented, parallel to the ground or floor, as shown in FIG. 3. Each wide end portion 35 of the seat 34 is preferably permanently attached by heavy duty stitching or other means to the surrounding strap member 32, which partially circumscribes the seat 34. The seat is supported by a support chain 28, hook, or other suitable material at each seat comer 37, which attaches to a linking clip member 24, as shown in FIG. 3 and FIG. 4. The strap members 32 preferably have a strip of lock and loop material at a front end.

To fasten the patient in the seat, the two front chains 28 are unsnapped from the linking clip members 24 to allow the user to enter the stroller 10 when the gate segments 23, 43 are open. The caregiver then pulls the front of the seat 34 through the patient's legs. Each strap member 32 is brought around the patient's corresponding side. One end of each seat support chain 28 is sewn into the wide portion 35 of the seat. The caregiver passes the nearest chain 28 through a loop on the strap member 32, then through loops sewn into the seat corners 37, which are shown in FIG. 1, then through a linking clip member 24. The caregiver wraps the strap member 32 around the patient's left leg, then his right leg, then she attaches the strap member 32 to the wide end portions 35 of the seat by pressing lock and loop strips on the end of each strap member 32 onto corresponding lock/loop strips on the front of the wide seat end portions 35. The seat is thus suspended at its four comers to the upper ring member 22. The two rear linking clip members 24 may potentially be unhooked, as well as the two front chains 28.

Figure 6:
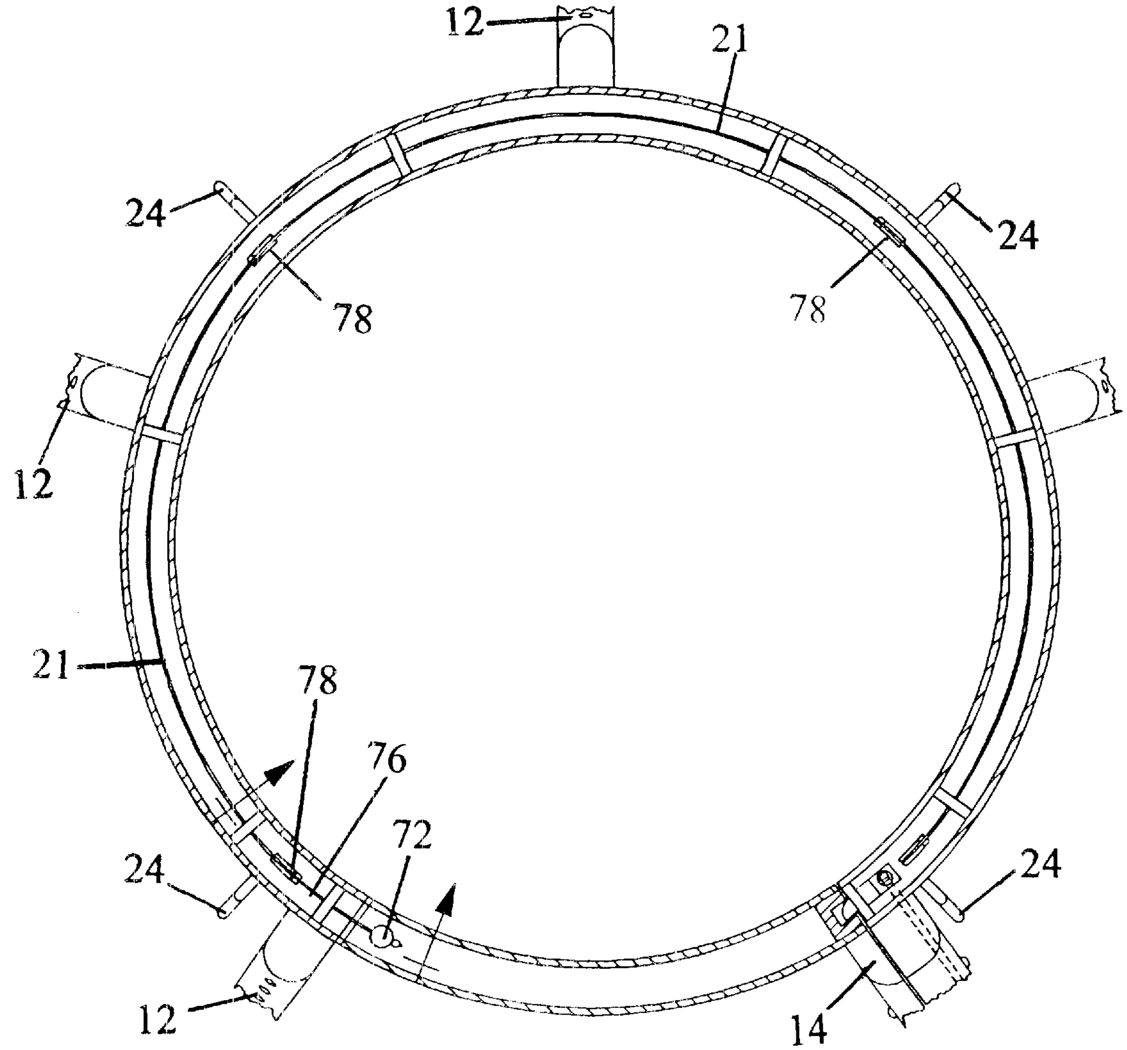
FIG. 6 is a cross-sectional view of an upper ring assembly of the ambulatory stroller according to FIG. 5, taken at line 6—6.
Figure 7:
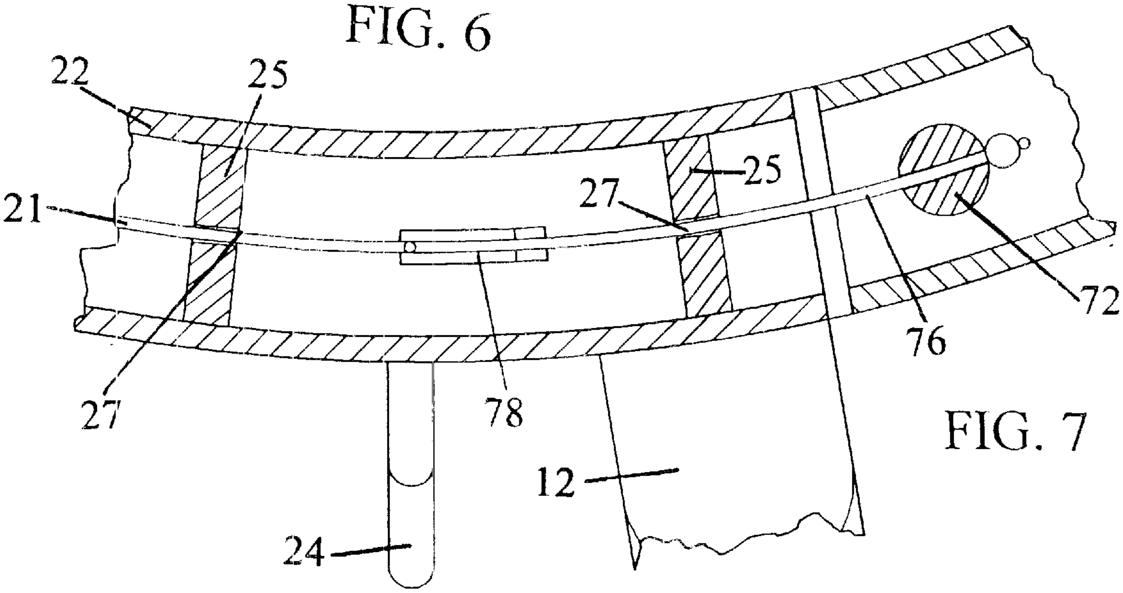
FIG. 7 is an expanded cross-sectional view of a gate segment of the upper ring assembly of the ambulatory stroller according to FIG. 6.
Figure 8:
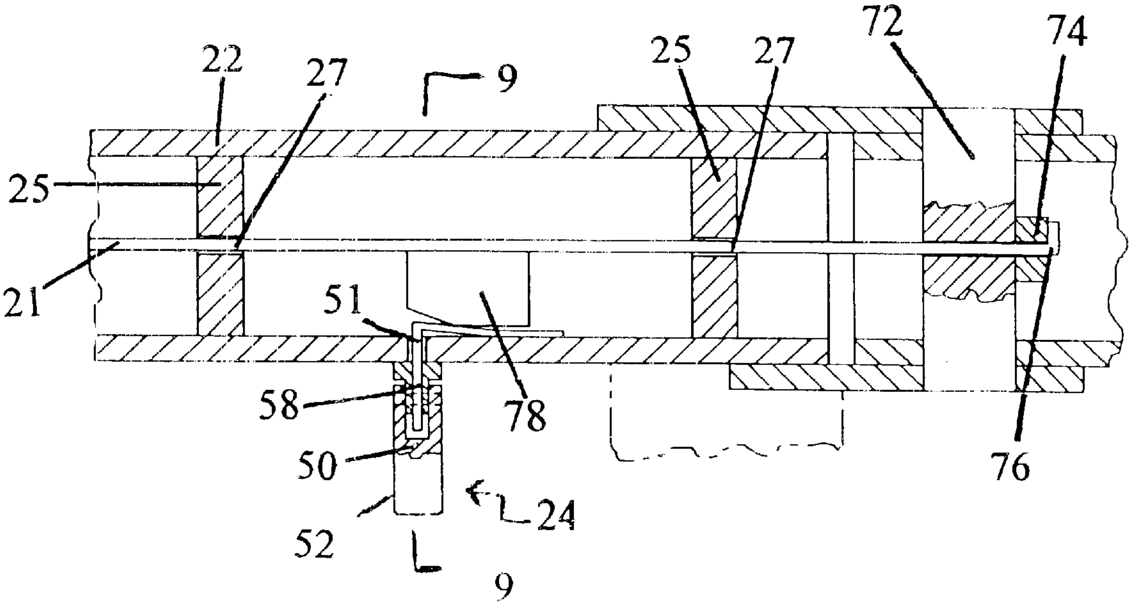
FIG. 8 is a cross-sectional view of a segment of the upper ring assembly of the ambulatory stroller according to FIG. 6, showing a linking clip member in a closed position.

Turning now to FIG. 6, FIG. 7, and FIG. 8, the upper ring member 22 contains an internal circular rod 21, which is supported at periodic intervals by a series of internal disks 25, each positioned transverse to the ring member 22. Each disk 25 has a hole 27 at its center of diameter just adequate enough to allow passage of the circular rod 21.

As shown in FIG. 6 and FIG. 7, a flexible swivel rod portion 76 of the internal circular rod 21 is affixed to the circular rod 21 between metal wedge 78 and an attachment site 72, where the swivel rod portion 76 is attached to the upper ring. When the caregiver opens the gate, the upper gate segment 23 is opened, which causes the upper ring internal rod 21 to retract. This permits clip pins 58 inside the clip post 56 to pop up, so the caregiver can then unlock the linking clip members 24, and unhook seat support chains 28 from the linking clip members 24 (see FIG. 8 and below). When the gate is closed, the swivel rod portion 76 advances the circular rod 21, which pushes the clip pins 58 in the linking clip members 24 in a downward direction, preventing the patient from being able to open the linking clip members 24 and free himself from the stroller 10.

Figure 9:
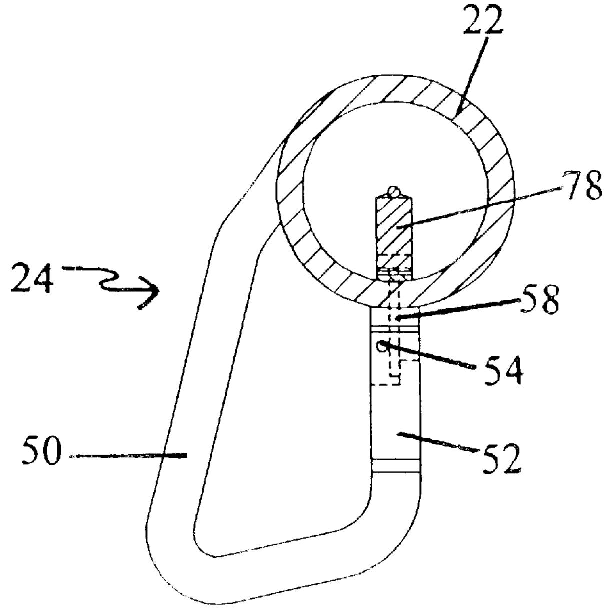
FIG. 9 is a perpendicular cross-sectional view of the linking clip member according to FIG. 8, taken at line 9—9, showing the linking clip member in the closed position.
Figure 10:
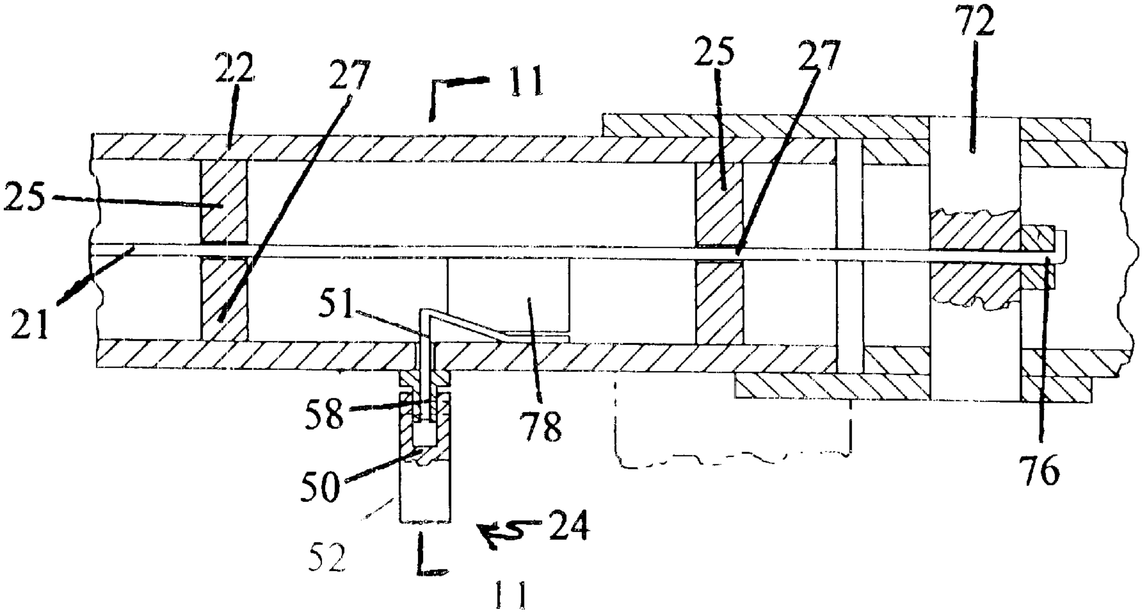
FIG. 10 is a cross-sectional view of a segment of the upper ring assembly of the ambulatory stroller according to FIG. 6, showing the linking clip member in an open position.
Figure 11:
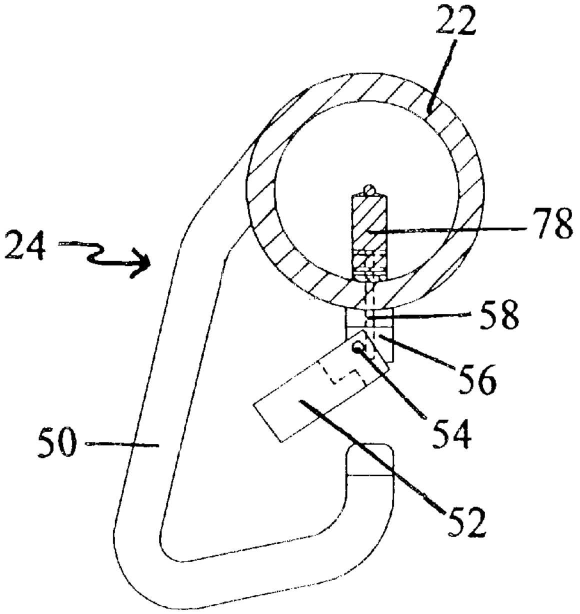
FIG. 11 is a perpendicular cross-sectional view of the linking clip member according to FIG. 10, taken at line 11—11, shown in an open position.

FIG. 8 and FIG. 10 both illustrate cross-sectional views of a select segment of the upper ring member 22 of an ambulatory stroller 10. FIG. 8 illustrates a linking clip member 24 in a closed position, while FIG. 10 shows the linking clip member 24 in an open position. FIG. 9 and FIG. 11 show close-up views of the linking clip member 24, the views being taken perpendicular to the cross-sections shown in FIG. 8 and FIG. 10. FIG. 9 shows the linking clip member 24 in a closed position, while FIG. 11 shows it in an open position. The linking clip member 24 comprises: a metal wedge 78 affixed to the upper ring circular rod 21, the metal wedge 78 impinging upon one end of a clip spring 51, an opposite end of the clip spring 51 contacting one end of a vertically oriented clip pin 58, an opposite end of the clip pin 58 being inserted into a vertically oriented cylindrical clip post 56, a swivelable tongue 52 being attached by a clip pivot 54 to one end of the clip post 56, an opposite end of the tongue fitting over one end of a clip housing 50, an opposite end of the clip housing 50 being attached to the upper ring member 22.

As shown in FIG. 8, FIG. 9, FIG. 10, and FIG. 11, each linking clip member 24 is attached transversely to the upper ring member 22 and is positioned so that the movable tongue 52 swings inwardly to open, rotating on a pivot 54 at its upper end, from the outside of the upper ring member 22 toward the seat 34. The seat support chain 28 loops past the tongue 52 in the linking clip member 24. A clip pin 58 inside the clip post 56 and projecting downwardly into the clip pin 58 and the tongue 52 will prevent the clip tongue 52 from opening accidentally. A clip spring 51 inside the ring member 22 joins the clip pin 58 and allows the opening of the tongue 52 when released. This unique system allows a caregiver to easily fasten the stroller around a patient, yet make it difficult for patients with Alzheimer's or other debilitating diseases to unfasten themselves from the device and wander away.

The swivel rod portion 76 is permanently attached to the inner circular rod 21. When the gate is closed and the inner circular rod 21 advances in a forward direction, metal wedge 78 impinges on clip spring 51. The clip spring 51 presses down on the clip pin 58 in the linking clip member 24, so the tongue 52 in the linking clip member 24 cannot open (see FIG. 9). When the gate is opened, the inner circular rod 21 is retracted and the metal wedge 78 is pulled back, which pulls the clip pin 58 up. This frees the linking clip member 24 so it can be opened, and the patient can be released from the stroller 10.

Figure 12:
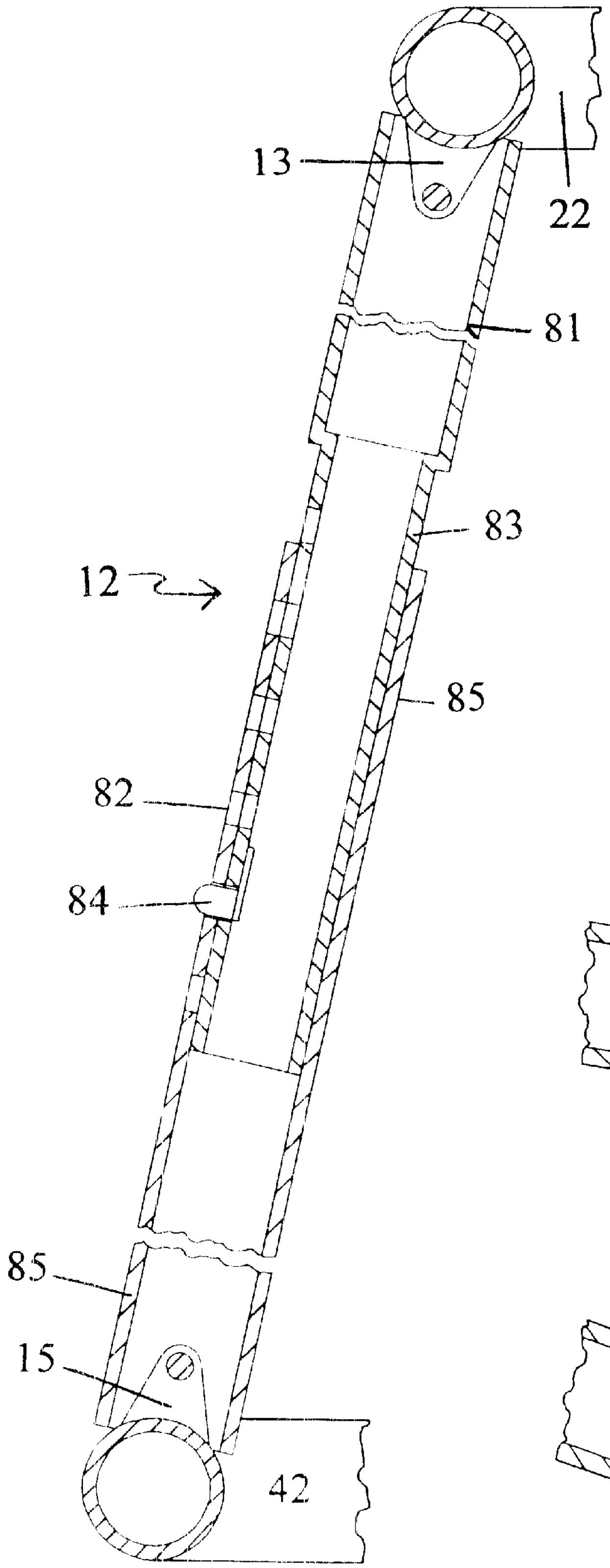
FIG. 12 is a cross-sectional view of a telescoping segment of a leg of an ambulatory stroller according to the present invention.
Figure 13:
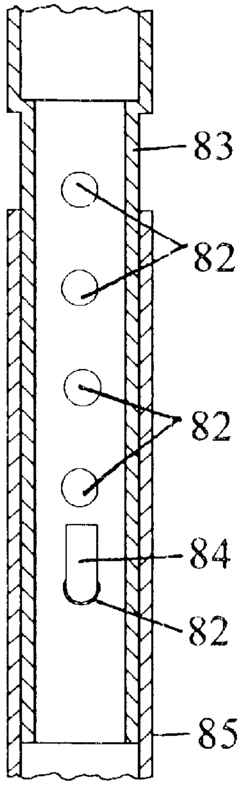
FIG. 13 is a cross-sectional view of a telescoping segment of a leg of the ambulatory stroller according to the present invention.

As seen in FIG. 12 and FIG. 13, each leg 12 is joined to the upper ring member 22 and lower ring member 42 by means of a joint 13, 15 in order to maintain the proper leg angle (inclination) when the legs are telescoped. Each leg 12 has an upper leg segment 81, a narrower middle leg segment 83, and a lower leg segment 85. The upper and middle leg segments 81, 83 are made of one piece, with the narrower middle leg segment 83 fitting into the lower segment 85 like a sleeve. The lower segment 85 is perforated by a series of vertically aligned holes 82, five in the preferred embodiment, and the middle segment contains a button 84 which may fit through any one of the holes 82. By pushing the spring-loaded button 84 inward and disengaging it from the hole 82, the caregiver may release the adjustment mechanism and may then slide the upper and middle leg segments 81, 83 up or down to the desired height. A spring inside the leg adjustment button 84 pushes the button outward and into the desired hole 82 to secure the leg 12 at the desired height. Thus the legs 12 may telescope into different heights according to the needs of the patient. One embodiment includes legs 12, 14 which collapse to approximately one fourth of their extended length, so the stroller 10 can be rolled onto its side for storage behind a closet door or bed.

Figure 14:
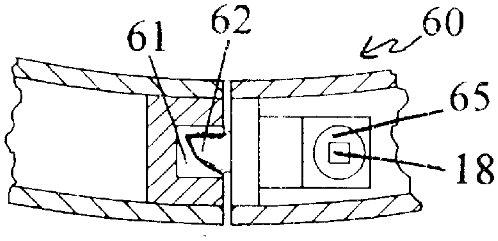
FIG. 14 is a cross-sectional view of a gate latch of the ambulatory stroller according to the present invention, shown in a closed position.
Figure 15:
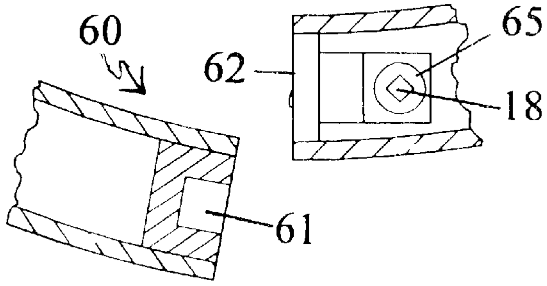
FIG. 15 is a cross-sectional view of the gate latch of the ambulatory stroller according to FIG. 14, shown in an open position.

Turning to FIG. 14 and FIG. 15, the gate segment 23 of the upper ring member 22, and preferably the lower ring member 42, latches by means of a latch mechanism 60. In use, an internal leg rod 18 passing vertically through the vertically oriented gate leg 14, which is generally rectangular in cross-section, rotates and turns the latch mechanism, causing the latch 62 to project into the corresponding notch 61 in the upper or lower ring member, thus locking the gate in the closed position. The internal leg rod 18 is preferably solid, weighted, and generally rectangular in cross-section. Only the gate leg 14, not the other four legs 12, holds an internal leg rod 18. The gate leg extends between the upper gate segment 23 and the lower gate segment 43. The internal leg rod 18 in its sleeve 65 is permanently affixed to the latch 62 in the upper and lower ring assemblies. When the gate leg 14 is adjusted, the middle segment 83 of the internal leg rod 18 telescopes, which causes the internal leg rod 18, which also telescopes, to move up or down in the upper and lower ring assemblies.

The gate leg assembly 14, which comprises one of the stroller legs, extends between the upper gate segment 23 and the lower gate segment 43, and a vertically oriented internal leg rod 18 enclosed within the gate leg, the internal leg rod being generally rectangular in cross-section. The gate leg assembly 14 comprises the upper leg segment 81, which is slidingly connected to a middle leg segment 83, which is slidingly connected to a lower leg segment 85. The lower leg segment is affixed at a lower end to the lower ring member. The upper leg segment is connected at an upper end to the upper ring member 22.

The stroller also includes a means for connecting 16 the upper gate segment to the lower gate segment, so they both open at the same time. Preferably, the gate leg assembly 14 comprises the connection means: a gate handle 16 extending between the upper ring assembly and the lower ring assembly (see FIG. 4). The diameter of the gate handle is less than the diameter of the gate leg, and the lengths of the two are approximately the same. The gate handle 16 comprising a mechanism for adjusting its length, such as two slidable segments, so that its length adjusts with the telescoping legs. When the legs are lengthened, for example, the length of the gate handle adjusts accordingly. Once the gate is unlocked (as described herein), the caregiver pulls open the gate handle 16, which pulls open the upper and lower gate segments 23, 43.

Figure 16:
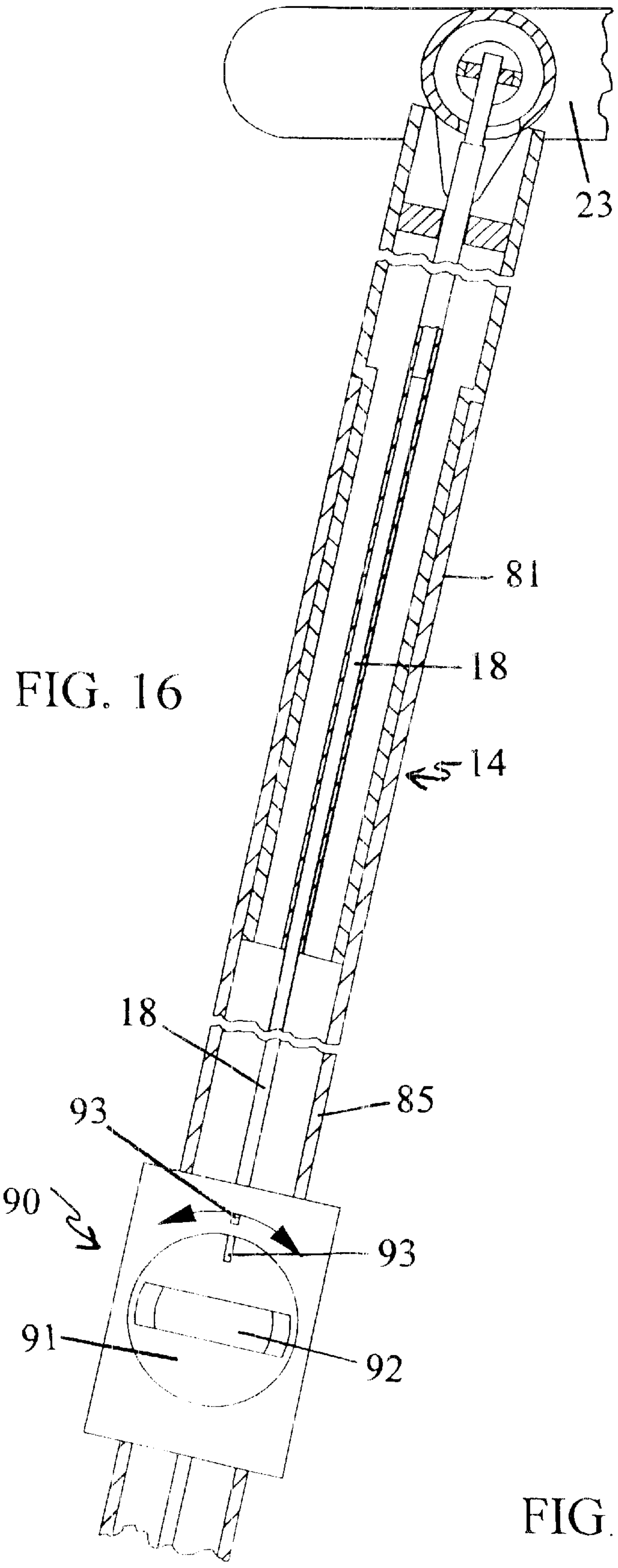
FIG. 16 is a cross-sectional view of an alternate embodiment of a leg of the ambulatory stroller according to the present invention, showing a dial locking mechanism.
Figure 17:
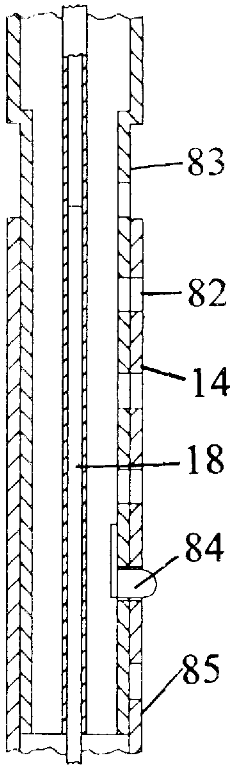
FIG. 17 is a cross-sectional view of the telescoping segment of a leg of the ambulatory stroller according to the present invention.
Figure 18:
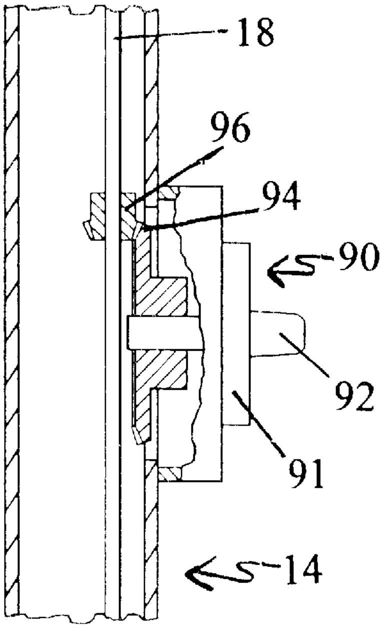
FIG. 18 is a cross-sectional view of a dial locking mechanism of an ambulatory stroller according to the present invention.

FIGS. 16–18 show cross-sectional views of an alternate embodiment of a gate leg of an ambulatory stroller according to the present invention. FIGS. 16 and 18 illustrate a front view (FIG. 16) and a cutaway side view (FIG. 18) of a dial locking mechanism 90 according to the present invention. FIG. 17 shows the telescoping middle segment of the gate leg shown in FIG. 16, except that the middle leg segment 83 in FIG. 17 is in a more expanded position than the middle leg segment shown in FIG. 16. The leg segment in FIG. 17 is oriented so that the leg adjustment button 84 is shown protruding through the lowermost of the five leg adjustment holes 82. The gate leg 14 shown in FIG. 16 includes the dial locking mechanism 90 near the bottom end, and the juncture of the leg 14 and the upper gate segment 23 of the upper ring 22 at the top of the figure. Inside the gate leg 14 is the central rectangular leg rod 18, which correspondingly telescopes with the leg 14.

The dial locking mechanism 90 is affixed to the gate leg assembly 14 of the stroller 10. It includes a dial 91 movably connected to a first gear 94, which is operably interconnected with a second gear 96, which is affixed to the internal leg rod 18. The internal leg rod 18 is moved by means of the dial locking mechanism 90, which shows the dial 91 on the lower segment 85 of the gate leg 14. The dial 91 operates by turning a dial handle 92 on the face of the handle. This causes the first gear 94 on the back of the dial to rotate, which in turn rotates a second gear 96 changing the direction of rotation, so that the internal leg rod 18 moves, thus opening the gate latch 62. Unless the dial 91 is turned, the gate remains closed (steady state). When the two dial notches 93 are aligned, as shown in FIG. 16, the dial 91 is depressible. When the dial notches 93 are not aligned, the dial 91 is not depressible. This mechanism is designed to foil a patient outside the stroller 10 who is attempting to unfasten the gate.

To use the dial mechanism 90, the user depresses the dial 91 and rotates it clockwise. Teeth on the first gear 94 on the back of the dial 91 interlock with teeth on the second gear 96, which is joined to the internal leg rod 18. Rotating the dial thereby moves the internal leg rod 18 in, causing the gate to unlock. In the preferred embodiment, both gate segments, upper 23 and lower 43, unlock at the same time. The user can then pull the gate open. Once the gate is released, the dial mechanism and gate automatically spring back into the closed position.

From the foregoing it can be realized that the described device of the present invention may be easily and conveniently utilized as an ambulatory stroller. It is to be understood that any dimensions given herein are illustrative, and are not meant to be limiting.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Brief List of Reference Numbers Used in the Drawings

10 ambulatory stroller
12 stroller leg
13 upperlegjoint
14 gate leg assembly
15 lowerlegjoint
16 gate handle
18 leg internal rod
20 upper ring assembly
21 upper ring internal rod
22 upper ring member
23 upper ring gate segment
24 linking clip member
25 internal rod supports
26 gate upper ring hinge
27 internal rod support hole
28 seat support chain
29 chain loop
30 seat assembly
32 strap member
34 seat
35 wide seat end portions
36 seat center portion
37 seat strap corner
40 lower ring assembly
42 lower ring member
43 lower ring gate segment
44 wheels
46 gate lower ring hinge
50 clip housing
51 clip spring

52 clip movable tongue
54 clip pivot
56 clip post
58 clip pin
60 latch mechanism
61 notch
62 latch
65 sleeve
72 attachment site of swivel rod portion
76 swivel rod portion
78 metal wedge
81 upper leg segment
82 leg adjustment holes
83 middle leg segment
84 leg adjustment button
85 lower leg segment
90 dial locking mechanism
91 dial
92 dial handle
93 dial notches
94 first gear
96 second gear

What is claimed is:

1. A stroller for helping an individual to ambulate, the stroller comprising:

(a) an upper ring assembly, comprising an upper ring member and a hinged upper gate segment having an open position and a closed position;

(b) a lower ring assembly, comprising a lower ring member, the upper ring member being substantially parallel to and above the lower ring member, the upper ring member having a diameter between about ¼ and ½ the diameter of the lower ring member; and comprising a hinged lower gate segment connected to the lower ring member within the lower ring assembly, the lower gate segment having an open position and a closed position;

(c) a seat assembly connected to the upper ring member;

(d) at least three spaced-apart legs connecting the lower ring member to the upper ring member; and (e) at least three spaced-apart wheels connected to the base of the lower ring member.

2. A stroller according to claim 1, wherein the seat assembly comprises a flexible seat suspended from the upper ring member, the seat assembly having an open position and a closed position.

3. A stroller according to claim 1, wherein the legs comprise a telescoping mechanism.

4. A stroller according to claim 1, further comprising a means for connecting the upper gate segment to the lower gate segment.

5. A stroller for helping an individual to ambulate, the stroller comprising:

(a) an upper ring assembly, comprising an upper ring member and a hinged upper gate segment having an open position and a closed position;

(b) a lower ring assembly, comprising a lower ring member, the upper ring member being substantially parallel to and above the lower ring member, the upper ring member having a diameter between about ¼ and ½ the diameter of the lower ring member;

(c) a seat assembly connected to the upper ring member;

(d) at least three spaced-apart legs connecting the lower ring member to the upper ring member;

(e) at least three spaced-apart wheels connected to the base of the lower ring member;

(f) a hinged lower gate segment connected to the lower ring member within the lower ring assembly, the lower gate segment having an open position and a closed position; and (g) a means for connecting the upper gate segment to the lower gate segment;

wherein the upper ring member encloses an internal circular rod, the internal circular rod comprising a flexible swivel rod portion.

6. A stroller according to claim 5, wherein the seat is suspended from the upper ring assembly by at least two evenly spaced locking clip members.

7. A stroller for helping an individual to ambulate, the stroller comprising:

(a) an upper ring assembly, comprising an upper ring member and a hinged upper gate segment having an open position and a closed position;

(b) a lower ring assembly, comprising a lower ring member, and a lower gate segment the upper ring member being substantially parallel to and above the lower ring member, the upper ring member having a diameter between about ¼ and ½ the diameter of the lower ring member;

(c) a seat assembly connected to the upper ring member;

(d) at least three spaced-apart legs connecting the lower ring member to the upper ring member, the legs comprising a telescoping mechanism;

(e) at least three spaced-apart wheels connected to the base of the lower ring member; and (f) a gate leg assembly comprising one of the legs, and a vertically oriented internal leg rod enclosed within the gate leg assembly, the internal leg rod being generally rectangular in cross-section, the gate leg assembly extending between the upper gate segment and the lower gate segment.

8. A stroller according to claim 7, wherein each ring assembly further comprises a latch mechanism, the internal leg rod being affixed at each end to the latch mechanism.

9. A stroller according to claim 8, wherein the gate leg assembly comprises an upper leg segment slidingly connected to a middle leg segment, which is slidingly connected to a lower leg segment, the lower leg segment being affixed at a lower end to the lower ring member, the upper segment being connected at an upper end to the upper ring member.

10. A stroller according to claim 9, wherein the latch mechanism comprises a latch which projects into a corresponding notch in the upper or lower ring member, the latch being operably connected to the internal leg rod.

11. A stroller according to claim 10, wherein the gate leg assembly further comprises a gate handle extending between the upper ring assembly and the lower ring assembly, the gate handle comprising a mechanism for adjusting its length.

12. A stroller according to claim 8, further comprising a dial locking mechanism affixed to the gate leg assembly of the stroller, the dial locking mechanism comprising a dial movably connected to a first gear, which is operably interconnected to a second gear, the second gear being affixed to the internal leg rod.

13. A stroller according to claim 12, wherein the gate leg assembly further comprises a leg adjustment mechanism comprising a spring-loaded button on the middle segment, which is insertable through any one of a plurality of vertically aligned holes perforating the lower segment.

14. A stroller according to claim 12, wherein the stroller includes a brake mechanism for braking the wheels.

15. A stroller according to claim 6, wherein a seat assembly chain or hook connects each corner of the seat assembly to a locking clip member.

16. A stroller according to claim 15, wherein the locking clip member comprises: a metal wedge affixed to the upper ring circular rod, the metal wedge impinging upon one end of a clip spring, an opposite end of the clip spring contacting one end of a vertically oriented clip pin, an opposite end of the clip pin being inserted into a vertically oriented cylindrical clip post, a swivelable tongue being attached by a clip pivot to one end of the clip post, an opposite end of the tongue fitting over one end of a clip housing, an opposite end of the clip housing being attached to the upper ring member.

17. A stroller according to claim 6, wherein the seat assembly comprises two seat strap members, each being attached to an end portion of the seat.

* * * * *